(12) United States Patent
Tsai et al.

(10) Patent No.: US 9,076,438 B2
(45) Date of Patent: Jul. 7, 2015

(54) AUDIO PROCESSING METHOD AND APPARATUS BY UTILIZING A PARTITION DOMAIN SPREADING FUNCTION TABLE STORED IN THREE LINEAR ARRAYS FOR REDUCING STORAGE

(75) Inventors: Tsung-Han Tsai, Jhongli (TW); Yu-Jie Sha, Taipei (TW)

(73) Assignee: NATIONAL CENTRAL UNIVERSITY, Taoyuan (TW)

( * ) Notice: Subject to any disclaimer, the term of this patent is extended or adjusted under 35 U.S.C. 154(b) by 388 days.

(21) Appl. No.: 13/329,481

(22) Filed: Dec. 19, 2011

(65) Prior Publication Data

US 2013/0054252 A1    Feb. 28, 2013

(30) Foreign Application Priority Data

Aug. 26, 2011    (TW) .............................. 100130740 A

(51) Int. Cl.

| | |
|---|---|
| *G10L 19/00* | (2013.01) |
| *G10L 19/02* | (2013.01) |
| *G10L 19/008* | (2013.01) |
| *G10L 19/035* | (2013.01) |
| *G10L 19/12* | (2013.01) |
| *H04B 1/66* | (2006.01) |

(52) U.S. Cl.
CPC .......... *G10L 19/0204* (2013.01); *G10L 19/008* (2013.01); *G10L 19/12* (2013.01); *H04B 1/665* (2013.01); *G10L 19/0212* (2013.01); *G10L 19/035* (2013.01)

(58) Field of Classification Search
CPC ...................................................... G10L 19/032
USPC .................................................. 704/229, 226
See application file for complete search history.

(56) References Cited

U.S. PATENT DOCUMENTS

| | | | | |
|---|---|---|---|---|
| 5,341,457 A | * | 8/1994 | Hall et al. ..................... | 704/226 |
| 6,014,621 A | * | 1/2000 | Chen ............................. | 704/220 |
| 6,157,938 A | * | 12/2000 | Wu et al. ....................... | 708/404 |
| 8,332,216 B2 | * | 12/2012 | Kurniawati et al. .......... | 704/229 |
| 2008/0004873 A1 | * | 1/2008 | Liu et al. ....................... | 704/229 |

* cited by examiner

*Primary Examiner* — Farzad Kazeminezhad

(74) *Attorney, Agent, or Firm* — McClure, Qualey & Rodack, LLP

(57) ABSTRACT

An audio processing method is disclosed. In the audio processing method, a modified discrete cosine transform (MDCT) algorithm is utilized to transform a present time domain audio signal into a spectrum audio signal. A spreading function (SF) coefficient of each partition domain of the spectrum audio signal is obtained by referencing an SF table, wherein the table is stored in three linear arrays based on non-zero SF-Coefficient values. A masking partitioned energy threshold of each partition domain of the spectrum audio signal is calculated utilizing a logarithmic scale. An audio block type of each partition domain and an SMR of the spectrum audio signal are calculated. Subsequently, the spectrum audio signal is compressed into an audio bit stream according to the audio block type of each partition domain and the SMR. In addition, an audio signal processing apparatus is also disclosed in this invention.

9 Claims, 3 Drawing Sheets

| Y \ X | 0 | 1 | 2 | 3 | 4 | 5 | 6 |
|---|---|---|---|---|---|---|---|
| 0 | 14 | 15 | 16 | 0 | 0 | 0 | 0 |
| 1 | 17 | 18 | 19 | 20 | 0 | 0 | 0 |
| 2 | 0 | 21 | 22 | 23 | 24 | 0 | 0 |
| 3 | 0 | 0 | 25 | 26 | 27 | 28 | 0 |
| 4 | 0 | 0 | 0 | 29 | 30 | 31 | 32 |
| 5 | 0 | 0 | 0 | 0 | 33 | 34 | 35 |
| 6 | 0 | 0 | 0 | 0 | 0 | 36 | 37 |

Fig. 2

AUDIO PROCESSING METHOD AND APPARATUS BY UTILIZING A PARTITION DOMAIN SPREADING FUNCTION TABLE STORED IN THREE LINEAR ARRAYS FOR REDUCING STORAGE

RELATED APPLICATIONS

This application claims priority to Taiwan Application Serial Number 100130740, filed Aug. 26, 2011, which is herein incorporated by reference.

BACKGROUND

1. Technical Field

The present invention relates to an audio processing method and apparatus.

2. Description of Related Art

As computer technology develops, digital multimedia technology and related applications are widely utilized in our daily lives and social activities. Most multimedia files (for example, video, audio, pictures, etc.) need to be converted for transmission through limited network bandwidth. As for audio compression standards, MPEG-1 Layer 3 (MP3) is the most popular. As technology develops, many new audio standards with higher compression ratios and better compression quality are being developed. In 1994, the Moving Picture Experts Group (MPEG) announced a new audio compression standard, namely, MPEG-2 Advanced Audio Coding (AAC). Since MPEG-2 AAC has better compression efficiency and quality than MP3, it is believed that MP3 will be replaced by MPEG-2 AAC. In addition, MPEG-4 AAC, which utilizes MPEG-2 AAC as its kernel, was subsequently announced in 1998. MPEG-4 AAC adopts many advanced technologies to solve issues related to compression efficiency and quality, and is expected to be popular in the future.

In the prior art, fast Fourier transform (FFT), the computing complexity of which is very high, is used in the Psychoacoustic Model (PAM) of MPEG-2/4 AAC. As a result, it is hard for mobile apparatuses (for example, mobile phones, portable audio players, USB flash drives, etc.) to play audio utilizing MPEG-2/4 AAC in real time due to its high complexity.

Hence, there is a need to reduce the computing complexity of audio compression while maintaining good audio quality.

SUMMARY

According to one embodiment of this invention, an audio processing method is provided to transform a present time domain audio signal into a spectrum audio signal utilizing a modified discrete cosine transform (MDCT) algorithm and to compress the spectrum audio signal into an audio bit stream according to the audio block type of each partition domain and the SMR, which are generated respectively utilizing a look-up table and a logarithmic scale. In the audio processing method, a present time domain audio signal is received. The present time domain audio signal is transformed into a spectrum audio signal utilizing an MDCT algorithm. The spectrum audio signal includes several partition domains. A partitioned energy of each of the partition domains of the spectrum audio signal is calculated. A present spectral flatness measure (SFM) of the spectrum audio signal is calculated according to the spectrum audio signal. A spreading function (SF) coefficient of each of the partition domains of the spectrum audio signal is obtained by referencing an SF table. According to the partitioned energy of each of the partition domains of the spectrum audio signal, the corresponding SF coefficient is normalized for adjustment. A present tonality index is calculated according to the present SFM. A present signal-to-noise ratio (SNR) of each of the partition domains of the spectrum audio signal is calculated according to the present tonality index. A logarithmic scale is utilized to calculate a masking partitioned energy threshold of each of the partition domains of the spectrum audio signal according to the present SNR and the adjusted SF coefficient of each of the partition domains of the spectrum audio signal. An audio block type of each of the partition domains of the spectrum audio signal is obtained according to a present bandwidth, the partitioned energy and the masking partitioned energy threshold of each of the partition domains of the spectrum audio signal. A signal-to-mask ratio (SMR) of the spectrum audio signal is calculated according to the spectrum audio signal, the masking partitioned energy threshold of each of the partition domains of the spectrum audio signal and the present bandwidth. The spectrum audio signal is compressed into an audio bit stream according to the audio block type of each of the partition domains of the spectrum audio signal and the SMR.

According to another embodiment of this invention, an audio processing apparatus is provided to transform a present time domain audio signal into a spectrum audio signal utilizing an MDCT algorithm and to compress the spectrum audio signal into an audio bit stream according to the audio block type of each partition domain and the SMR, which are generated respectively utilizing a look-up table and a logarithmic scale. The audio processing apparatus includes an MDCT module, an SFM module, an SF module, a threshold generating module, a block-type determining module, an SMR module and a Q loop module. The MDCT module transforms a received present time domain audio signal into a spectrum audio signal utilizing an MDCT algorithm. The spectrum audio signal includes several partition domains. The SFM module calculates a present SFM of the spectrum audio signal according to the spectrum audio signal. The SF module calculates a partitioned energy of each of the partition domains of the spectrum audio signal. The SF module obtains an SF coefficient of each of the partition domains of the spectrum audio signal by referencing an SF table. Subsequently, the SF module normalizes the SF coefficient of each of the partition domains of the spectrum audio signal for adjustment according to the corresponding partitioned energy. The threshold generating module calculates a present tonality index according to the present SFM. The threshold generating module calculates a present SNR of each of the partition domains of the spectrum audio signal according to the present tonality index. Subsequently, the threshold generating module utilizes a logarithmic scale to calculate a masking partitioned energy threshold of each of the partition domains of the spectrum audio signal according to the present SNR and the adjusted SF coefficient of each of the partition domains of the spectrum audio signal. The block-type determining module determines an audio block type of each of the partition domains of the spectrum audio signal according to a present bandwidth, the partitioned energy and the masking partitioned energy threshold of each of the partition domains of the spectrum audio signal. The SMR module calculates an SMR of the spectrum audio signal according to the spectrum audio signal, the masking partitioned energy threshold of each of the partition domains of the spectrum audio signal and the present bandwidth. The Q loop module compresses the spectrum audio signal into an audio bit stream according to the audio block type of each of the partition domains of the spectrum audio signal and the SMR.

The present invention can achieve many advantages. The audio block type and the SMR, which are utilized for compressing the audio signal, can be generated without utilizing FFT. Hence, a reduction in computational and overall complexity resulting from avoiding FFT calculations may be realized. Even if the sampling rate of the audio signal is set to 44.1 KHz, the electrical apparatus equipped with a 20 MHz processor can smoothly play the audio signal thereof in one embodiment of this invention. As a result, electrical apparatuses with poor computational ability (for example, mobile phones, portable audio players, USB flash drives or any other mobile electrical apparatus) can utilize the method in this disclosure to smoothly play audio signals with good audio quality. In other words, audio coding standards with good compression efficiency and quality (for example, the MPEG-2 AAC standard) can be applied for electrical apparatuses with poor computational ability.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows:

FIG. 2 is an embodiment of an SF table; and

DETAILED DESCRIPTION

Figure 1:
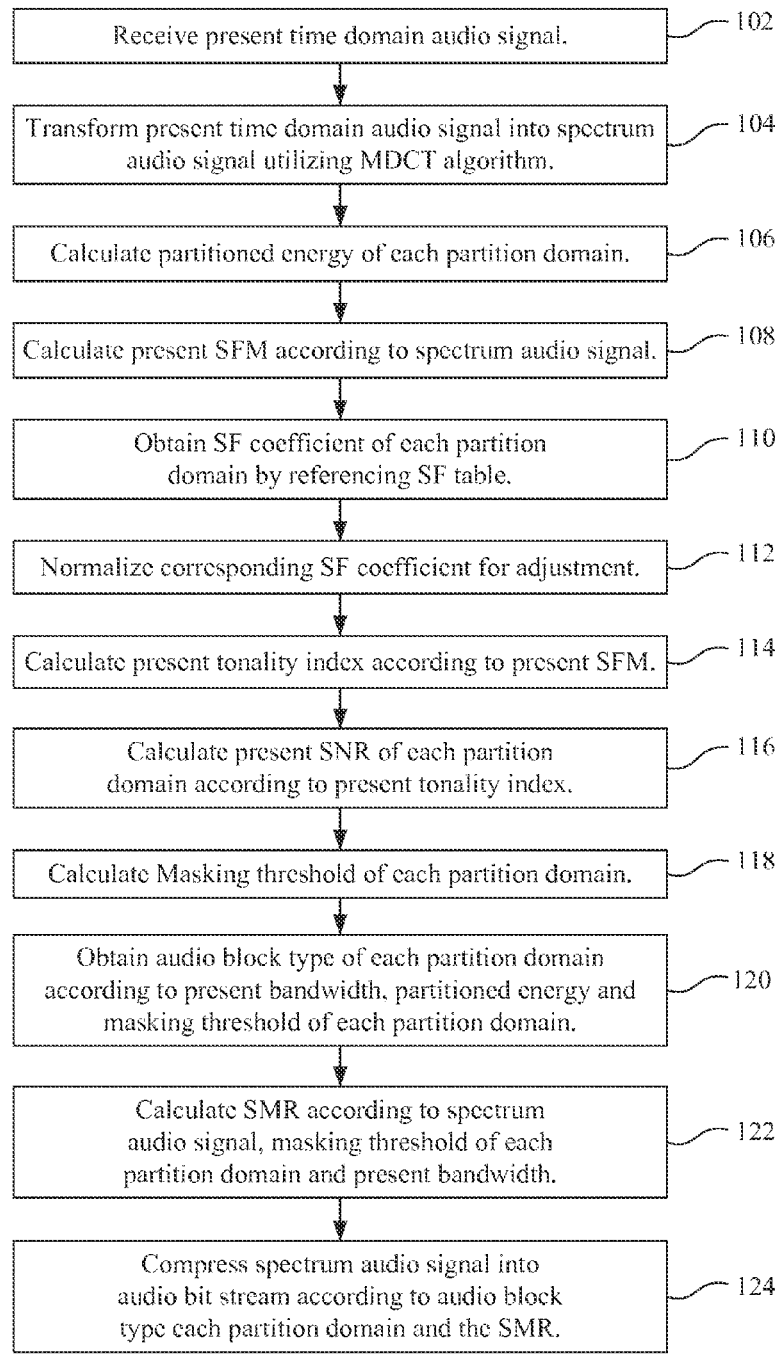
FIG. 1 is a flow diagram of an audio processing method according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, a flow diagram will be described that illustrates an audio processing method according to one embodiment of this invention. In the audio processing method, a present time domain audio signal is transformed into a spectrum audio signal utilizing an MDCT algorithm and the spectrum audio signal is compressed into an audio bit stream according to the audio block type of each partition domain and the SMR, which are generated respectively utilizing a look-up table and a logarithmic scale. The audio processing method may take the form of a computer program product stored on a computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs); and magnetic storage devices such as hard disk drives (HDD) and floppy disk drives.

The routine 100 for the display method starts at operation 102, where a present time domain audio signal is received. In some embodiments, the present time domain audio signal may include a left channel audio frame and a right channel audio frame. In other embodiments, the present time domain audio signal may include audio frames for multiple channels.

From operation 102, the routine 100 continues to operation 104, where the present time domain audio signal is transformed into a spectrum audio signal (referred to also as a frequency domain spectrum) utilizing an MDCT algorithm. The spectrum audio signal includes several partition domains. In addition, in one embodiment of this invention, a spectrum process (SPP) may be utilized to further simplify the complexity of the spectrum audio signal.

At operation 106, a partitioned energy of each of the partition domains of the spectrum audio signal is calculated. Operation 106 may be executed utilizing the following formula:

$$e(b)=P(b)^2$$

where b is a partition index corresponding to one of the partition domains, e(b) is the partitioned energy corresponding to the partition index b, and P(b) is the spectrum corresponding to the partition index b.

The routine 100 continues to operation 108, where a present SFM of the spectrum audio signal is calculated according to the spectrum audio signal. In one embodiment of operation 108, a geometric mean of the spectrum audio signal divided by an average of the spectrum audio signal may be calculated, and subsequently a logarithm of the division result may be calculated to be the present SFM of the spectrum audio signal, in which case the formula used for the calculation thereof is as follows:

$$SFM = 10\log_{10}\frac{G_m}{A_m}$$

where $G_m$ is the geometric mean of the spectrum audio signal, and $A_m$ is the average of the spectrum audio signal. Therefore, the logarithmic calculation can be utilized to reduce the computation for the division operation, which can reduce the complexity associated with calculating the present SFM.

At operation 110, an SF coefficient of each of the partition domains of the spectrum audio signal is obtained by referencing an SF table. Therefore, a reduction in computational complexity needed for calculating the SF may be realized. In addition, since the non-zero values are distributed diagonally in the SF table, the SF table that is referenced (i.e., used as a look-up table) may be stored in several linear arrays. Therefore, the storage space for storing the SF table can be reduced. FIG. 2 is an embodiment of the SF table. For example, there may be 7×7=49 values stored in the SF table. In this embodiment, three linear arrays may be utilized for storing the SF table. The initial x address of non-zero values at each row is stored in one linear array, the terminal x address of non-zero values at each row is stored in another linear array, and the non-zero values at each row are stored in the other linear array. Hence, the linear arrays mentioned thereof may be {0, 0, 1, 2, 3, 4, 5}, {2, 3, 4, 5, 6, 6, 6}, and {14,15,16,17,18,19, 20,21,22,23,24,25,26,27,28,29,30,31,32,33,34,35,36,37}. Subsequently, the original storage space needed for the SF table is 49×6(bits)=18424(bits), but the storage space needed for the linear arrays to store the SF table is 7×3(bits)+7×3 (bits)+24×6(bits)=186(bits). Since the non-zero values are between 14 and 37, 6 bits are needed for storing each non-zero value, and since the addresses are between 0 and 6, 3 bits are needed for storing the addresses. As a result, the storage space for storing the SF table can be further reduced. In other embodiments, other SF tables can be utilized for use as look-up tables, which should not be limited in this disclosure.

From operation 110, the routine 100 continues to operation 112, where according to the partitioned energy of each of the partition domains of the spectrum audio signal, the corresponding SF coefficient is normalized for adjustment. In some embodiments, operation 112 can be executed utilizing the following formula:

$$en(b) = \text{norm} \times (\Sigma e(b) \otimes sprdngf(b))$$

where en(b) is the SF coefficient corresponding to the partition index b, norm is a normalization process, ⊗ is a convolution operator, and sprdngf (b) is the SF coefficient corresponding to the partition index b before the adjustment.

At operation 114, a present tonality index is calculated according to the present SFM. In some embodiments, operation 114 can be executed utilizing the following formula:

$$tb = \frac{SFM}{-60}$$

where tb is the present tonality index.

From operation 114, the routine 100 continues to operation 116, where a present SNR of each of the partition domains of the spectrum audio signal is calculated according to the present tonality index. In some embodiments, operation 114 can be executed utilizing the following formula:

$$SNR(b) = tb(b) \times 12 + 6$$

where SNR(b) is the present SNR corresponding to the partition index b.

The routine 100 continues to operation 118, where a logarithmic scale is utilized to calculate a masking partitioned energy threshold of each of the partition domains of the spectrum audio signal according to the present SNR and the adjusted SF coefficient of each of the partition domains of the spectrum audio signal. In some embodiments, the formula for operation 118 to calculate in the logarithmic scale may be as follows:

$$\log n'b(b) = \log en(b) + \frac{SNR}{-10}$$

where n'b(b) is the masking partitioned energy threshold corresponding to the partition index b. In addition, the present masking partitioned energy threshold can be calculated according to the previous masking partitioned energy threshold and its audio block type, the formula for which is as follows:

$$\log nb(b) = \max[\log qsthr(b), \min(\log n'b(b), \log nb\_l(b) + \log(replev))]$$

where qsthr(b) is the threshold under a quiet status corresponding to the partition index b, nb_l(b) is the previous masking partitioned energy threshold corresponding to the partition index b, replev is set to 1 when its audio block type is SHORT type audio block, and replev is set to 0 when its audio block type is LONG type audio block.

At operation 120, an audio block type of each of the partition domains of the spectrum audio signal is obtained according to a present bandwidth, the partitioned energy and the masking partitioned energy threshold of each of the partition domains of the spectrum audio signal. The audio block type of each of the partition domains of the spectrum audio signal may be selected from one of a LONG type audio block, a SHORT type audio block, a LONG-START type audio block and a LONG-STOP type audio block. In one embodiment of operation 120, a Perceptual Entropy (PE) may be calculated according to the present bandwidth, the partitioned energy and the masking partitioned energy threshold of each partition domain, and the PE may be used to determine the audio block type, in which case the formula used may be as follows:

$$PE = PE - (BW \times (\log nb(b) - \log e(b)))$$

where BW is the present bandwidth. Hence, in one embodiment of operation 120, the audio block type can be determined according to a preset threshold and a determination of whether the audio block type needs to be switched.

At operation 122, an SMR of the spectrum audio signal is calculated according to the spectrum audio signal, the masking partitioned energy threshold of each of the partition domains of the spectrum audio signal and the present bandwidth.

Hence, at operation 124, the spectrum audio signal is compressed into an audio bit stream according to the audio block type of each of the partition domains of the spectrum audio signal and the SMR. Hence, the audio block type and the SMR, which are utilized for compressing the audio signal, can be generated without utilizing fast Fourier transform (FFT). Hence, a reduction in computational and overall complexity resulting from avoiding FFT calculations may be realized. As a result, electrical apparatuses with poor computational ability (for example, mobile phones, portable audio players, USB flash drives or any other mobile electrical apparatus) can utilize the method in this disclosure. In other words, audio coding standards with good compression efficiency and quality (for example, the MPEG-2 AAC standard) can be applied for the electrical apparatuses with poor computational ability utilizing the method in the routine 100. In addition, operation 124 can be executed in the logarithmic scale to further reduce the resources needed for computation at operation 124.

Figure 3:
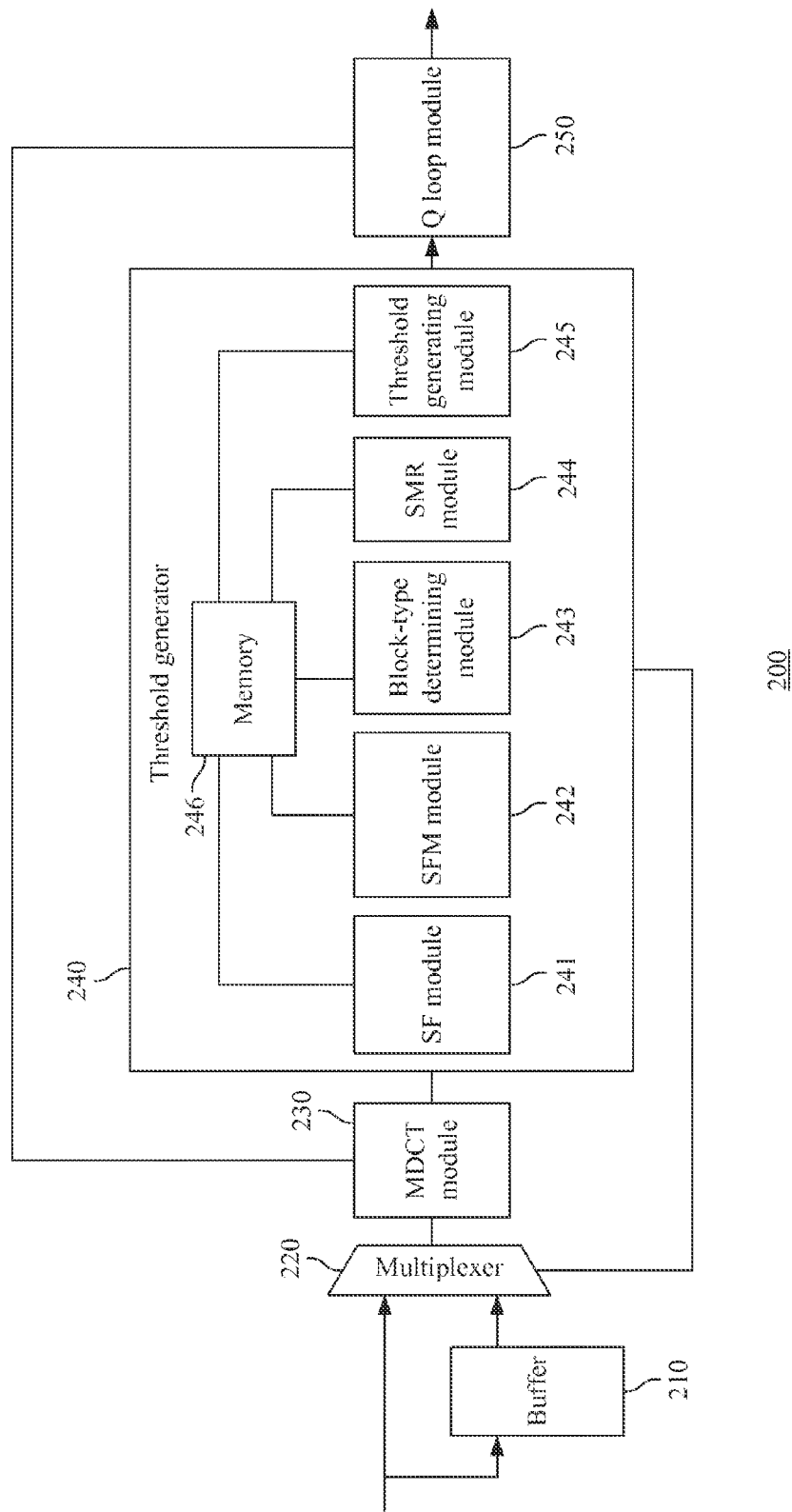
FIG. 3 is a block diagram of an audio processing apparatus according to an embodiment of this invention.

Referring to FIG. 3, a block diagram will be described that illustrates an audio processing apparatus according to an embodiment of this invention. The audio processing apparatus is provided to transform a present time domain audio signal into a spectrum audio signal utilizing an MDCT algorithm and compress the spectrum audio signal into an audio bit stream according to the audio block type of each partition domain and the SMR, which are generated respectively utilizing a look-up table and a logarithmic scale.

The audio processing apparatus 200 includes an MDCT module 230, a threshold generator 240, and a quantization loop (Q loop) module 250. In some embodiments, the audio processing apparatus 200 may be implemented utilizing a digital signal processing (DSP) architecture. The MDCT module 230 transforms a received present time domain audio signal into a spectrum audio signal, which includes several partition domains, utilizing an MDCT algorithm. In some embodiments, the present time domain audio signal may include a left channel audio frame and a right channel audio frame. In other embodiments, the present time domain audio signal may include audio frames for multiple channels. Furthermore, the MDCT module 230 may be designed utilizing a pipelining architecture. In some embodiments, the received present time domain audio signal may be temporarily stored in a buffer 210 and a multiplexer 220. The buffer 210 may be a shift register or any other hardware. In greater detail, the buffer 210 may temporarily store the present time domain audio signal to be the previous time domain audio signal provided to the MDCT module 230 in a subsequent cycle. Hence, the MDCT module 230 can further take the previous time domain audio signal stored in the buffer 210 into consideration to transform the present time domain audio signal into the spectrum audio signal. In addition, in one embodiment of this invention, the MDCT module 230 may utilize SPP to further simplify the complexity of the spectrum audio signal.

The threshold generator 240 includes an SF module 241, an SFM module 242, a block-type determining module 243, a threshold generating module 245 and an SMR module 244. The SFM module 242 calculates a present SFM of the spectrum audio signal according to the spectrum audio signal. In one embodiment of this invention, the SFM module 242 may calculate a logarithm of a geometric mean of the spectrum audio signal divided by an average of the spectrum audio signal to be the present SFM of the spectrum audio signal. Therefore, the logarithmic calculation can be utilized to reduce the computation for the division operation, which can reduce the complexity associated with calculating the present SFM. In addition, the SFM module 242 may store the present SFM in a memory 246 of the threshold generator 240.

The SF module 241 calculates a partitioned energy of each of the partition domains of the spectrum audio signal. The SF module 241 obtains an SF coefficient of each of the partition domains of the spectrum audio signal by referencing an SF table. Therefore, a reduction in computational complexity needed for the SF module 241 to calculate the SF may be realized. In addition, since the non-zero values are distributed diagonally in the SF table, the SF table that is referenced may be stored in several linear arrays. Therefore, the storage space for storing the SF table can be reduced. Subsequently, the SF module 241 normalizes the SF coefficient of each of the partition domains of the spectrum audio signal for adjustment according to the corresponding partitioned energy. In addition, the SF module 241 may store the adjusted SF coefficient of each of the partition domains of the spectrum audio signal in the memory 246.

The threshold generating module 245 calculates a present tonality index according to the present SFM stored in the memory 246. The threshold generating module 245 calculates a present SNR of each of the partition domains of the spectrum audio signal according to the present tonality index. Subsequently, the threshold generating module 245 utilizes a logarithmic scale to calculate a masking partitioned energy threshold of each of the partition domains of the spectrum audio signal according to the present SNR and the adjusted SF coefficient of each of the partition domains of the spectrum audio signal. The block-type determining module 243 determines an audio block type of each of the partition domains of the spectrum audio signal according to a present bandwidth, the partitioned energy and the masking partitioned energy threshold of each of the partition domains of the spectrum audio signal. The SMR module 244 calculates an SMR of the spectrum audio signal according to the spectrum audio signal, the masking partitioned energy threshold of each of the partition domains of the spectrum audio signal and the present bandwidth.

Hence, the Q loop module 250 compresses the spectrum audio signal into an audio bit stream according to the audio block type of each of the partition domains of the spectrum audio signal and the SMR. Therefore, the audio block type and the SMR, which are utilized for compressing the audio signal, can be generated without utilizing FFT. Hence, a reduction in computational and overall complexity resulting from avoiding FFT calculations can be realized. As a result, even if the audio processing apparatus 200 is equipped with poor computational hardware, the audio processing apparatus 200 can execute audio coding standards with good compression efficiency and quality (for example, the MPEG-2 AAC standard). Furthermore, in some embodiments, the Q loop module 250 may compress the spectrum audio signal in the logarithmic scale. Hence, the computation in the Q loop module 250 can be further reduced.

The present invention can achieve many advantages. The audio block type and the SMR, which are utilized for compressing the audio signal, can be generated without utilizing FFT. Hence, a reduction in computational and overall complexity as a result of avoiding FFT calculations can be realized. Even if the sampling rate of the audio signal is set to 44.1 KHz, the electrical apparatus equipped with a 20 MHz processor can smoothly play the audio signal thereof in one embodiment of this invention. As a result, electrical apparatuses with poor computational ability (for example, mobile phones, portable audio players, USB flash drives or any other mobile electrical apparatus) can utilize the method in this disclosure to smoothly play audio signals with good audio quality. In other words, audio coding standards with good compression efficiency and quality (for example, the MPEG-2 AAC standard) can be applied for electrical apparatuses with poor computational ability.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An audio processing method comprising:
   (a) receiving a present time domain audio signal;
   (b) transforming the present time domain audio signal into a spectrum audio signal utilizing a modified discrete cosine transform (MDCT) algorithm, wherein the spectrum audio signal comprises a plurality of partition domains;
   (c) calculating a partitioned energy of each of the partition domains of the spectrum audio signal;
   (d) calculating a present spectral flatness measure (SFM) of the spectrum audio signal according to the spectrum audio signal;
   (e) obtaining a spreading function (SF) coefficient of each of the partition domains of the spectrum audio signal by referencing an SF table wherein the SF table is stored in a plurality of linear arrays, the linear arrays comprise a first linear array for storing an initial row address of the SF table of non-zero SF-coefficient values at each row, a second linear array for storing a terminal row address of the SF table of non-zero SF-coefficient values at each row, and a third linear array for storing the non-zero SF-coefficient values at each row of the SF table;
   (f) according to the partitioned energy of each of the partition domains of the spectrum audio signal, normalizing the corresponding SF coefficient for adjustment;
   (g) calculating a present tonality index according to the present SFM;

(h) calculating a present signal-to-noise ratio (SNR) of each of the partition domains of the spectrum audio signal according to the present tonality index;

(i) utilizing a logarithmic scale to calculate a masking partitioned energy threshold of each of the partition domains of the spectrum audio signal according to the present SNR and the adjusted SF coefficient of each of the partition domains of the spectrum audio signal;

(j) obtaining an audio block type of each of the partition domains of the spectrum audio signal according to a present bandwidth, the partitioned energy and the masking partitioned energy threshold of each of the partition domains of the spectrum audio signal;

(k) calculating a signal-to-mask ratio (SMR) of the spectrum audio signal according to the spectrum audio signal, the masking partitioned energy threshold of each of the partition domains of the spectrum audio signal and the present bandwidth; and (l) compressing the spectrum audio signal into an audio bit stream according to the audio block type of each of the partition domains of the spectrum audio signal and the SMR.

2. The audio processing method of claim 1, wherein the operation (d) comprises:

calculating a logarithm of a geometric mean of the spectrum audio signal divided by an average of the spectrum audio signal to be the present SFM of the spectrum audio signal.

3. The audio processing method of claim 1, wherein a formula utilized to execute the operation (f) is:

$$en(b) = \text{norm} \times (\Sigma e(b) \otimes sprdngf(b))$$

where b is a partition index corresponding to one of the partition domains, en(b) is the adjusted SF coefficient corresponding to the partition index b, norm is a normalization process, e(b) is the partitioned energy corresponding to the partition index b, $\otimes$ is a convolution operator, and sprdngf (b) is the SF coefficient corresponding to the partition index b before the adjustment.

4. The audio processing method of claim 1, wherein the audio block type of each of the partition domains of the spectrum audio signal is a LONG type audio block, a SHORT type audio block, a LONG-START type audio block or a LONG-STOP type audio block.

5. An audio processing apparatus comprising:

an MDCT module for transforming a received present time domain audio signal into a spectrum audio signal utilizing an MDCT algorithm, wherein the spectrum audio signal comprises a plurality of partition domains;

an SFM module for calculating a present SFM of the spectrum audio signal according to the spectrum audio signal;

an SF module for calculating a partitioned energy of each of the partition domains of the spectrum audio signal, obtaining an SF coefficient of each of the partition domains of the spectrum audio signal by referencing an SF table, and normalizing the SF coefficient of each of the partition domains of the spectrum audio signal for adjustment according to the corresponding partitioned energy, wherein the SF table is stored in a plurality of linear arrays, the linear arrays comprises a first linear array for storing an initial row address of the SF table of non-zero SF-coefficient values at each row, a second linear array for storing a terminal row address of the SF table of non-zero SF-coefficient values at each row, and a third linear array for storing the non-zero SF-coefficient values at each row of the SF table;

a threshold generating module for calculating a present tonality index according to the present SFM, calculating a present SNR of each of the partition domains of the spectrum audio signal according to the present tonality index, and utilizing a logarithmic scale to calculate a masking partitioned energy threshold of each of the partition domains of the spectrum audio signal according to the present SNR and the adjusted SF coefficient of each of the partition domains of the spectrum audio signal;

a block-type determining module for determining an audio block type of each of the partition domains of the spectrum audio signal according to a present bandwidth, the partitioned energy and the masking partitioned energy threshold of each of the partition domains of the spectrum audio signal;

an SMR module for calculating an SMR of the spectrum audio signal according to the spectrum audio signal, the masking partitioned energy threshold of each of the partition domains of the spectrum audio signal and the present bandwidth; and a Q loop module for compressing the spectrum audio signal into an audio bit stream according to the audio block type of each of the partition domains of the spectrum audio signal and the SMR.

6. The audio processing apparatus of claim 5 further comprising:

a buffer for temporarily storing a previous time domain audio signal, the MDCT module transforming the present time domain audio signal into the spectrum audio signal with reference to the previous time domain audio signal.

7. The audio processing apparatus of claim 6, wherein the buffer is a shift register.

8. The audio processing apparatus of claim 5, wherein the Q loop module compresses the spectrum audio signal into the audio bit stream utilizing the logarithmic scale.

9. The audio processing apparatus of claim 5, wherein the MDCT module is implemented with a pipelined architecture, and the audio processing apparatus is implemented with digital signal processing (DSP).

* * * * *